United States Patent [19]

Mosetich

[11] Patent Number: 5,078,357
[45] Date of Patent: Jan. 7, 1992

[54] ELECTRIC SEAT LIFT
[75] Inventor: Ronald J. Mosetich, Kosciusko, Miss.
[73] Assignee: Medical Resource Companies of America, Dallas, Tex.
[21] Appl. No.: 598,070
[22] Filed: Oct. 16, 1990
[51] Int. Cl.⁵ ............................................. F16M 11/00
[52] U.S. Cl. .................................. 248/405; 248/157; 248/413; 280/43.2; 297/345
[58] Field of Search ...................... 248/405, 406.1, 404, 248/132, 161, 413, 157; 297/345; 280/490.1, 43.2

[56] References Cited

U.S. PATENT DOCUMENTS

| | | |
|---|---|---|
| 1,600,597 | 9/1926 | Menges . |
| 1,606,654 | 11/1926 | Menges . |
| 3,191,196 | 6/1965 | Holm . |
| 3,851,917 | 12/1974 | Horstmann et al. ............... 297/345 |
| 3,882,949 | 5/1975 | Anderson ....................... 297/345 X |
| 3,891,270 | 6/1975 | Crossman et al. ............. 248/404 X |
| 3,905,436 | 9/1975 | Karchak, Jr. et al. . |
| 4,173,372 | 11/1979 | Norris ................................. 297/345 |
| 4,279,398 | 7/1981 | Pregnall ............................ 248/405 |
| 4,587,678 | 5/1986 | Love et al. ............................. 4/251 |
| 4,635,492 | 1/1987 | Uebelhart ..................... 248/405 X |
| 4,678,231 | 7/1987 | Chizek ............................... 297/329 |
| 4,750,701 | 6/1988 | Folson et al. .................. 248/406.1 |
| 4,842,233 | 6/1989 | Rusin ................................ 248/405 |
| 4,860,733 | 8/1989 | Parker, Jr. . |
| 4,946,222 | 8/1990 | Matson ............................. 297/345 |

Primary Examiner—Ramon O. Ramirez
Attorney, Agent, or Firm—Dowell & Dowell

[57] ABSTRACT

An electric seat lift mechanism is easily mounted or dismounted from a seat post receptacle by insertion of its depending tube into fixed (but removable) position into the seat post, the depending tube carrying an axially positioned drive nut which is engaged with a drive screw driven by an electric motor powered transmission whose housing supports the seat.

9 Claims, 2 Drawing Sheets

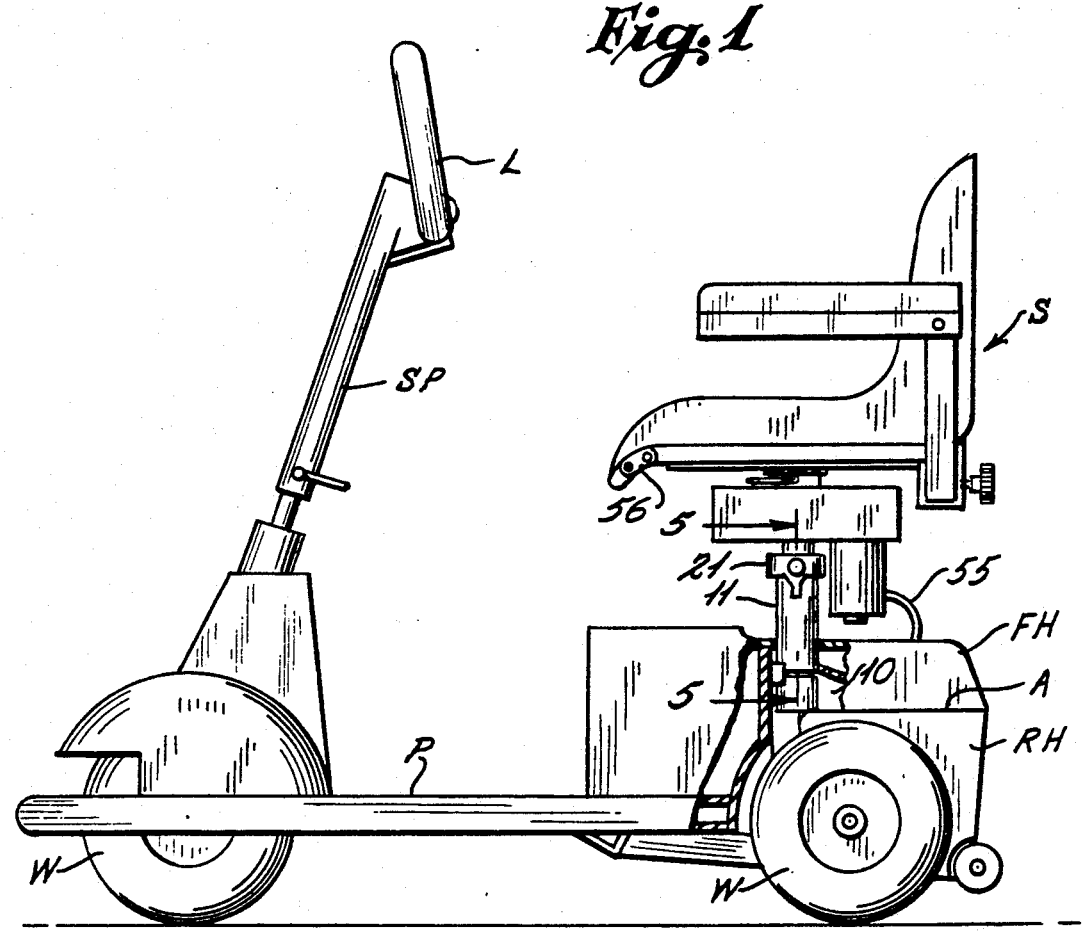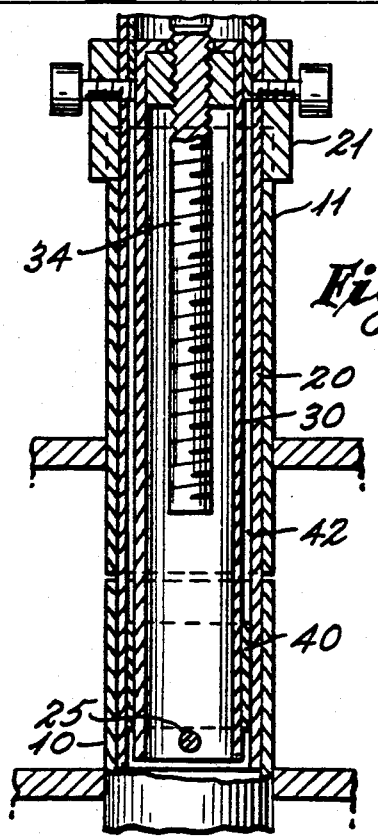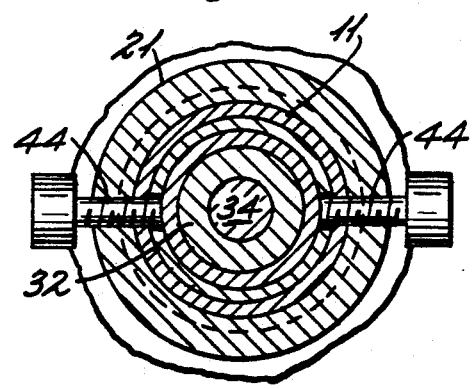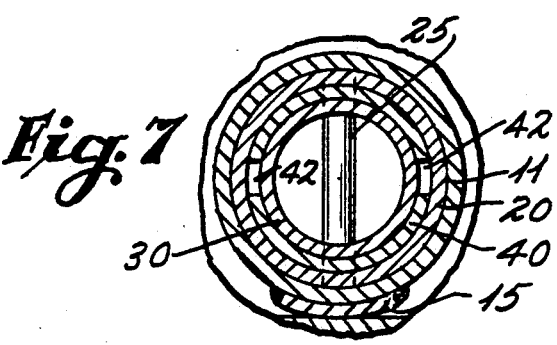

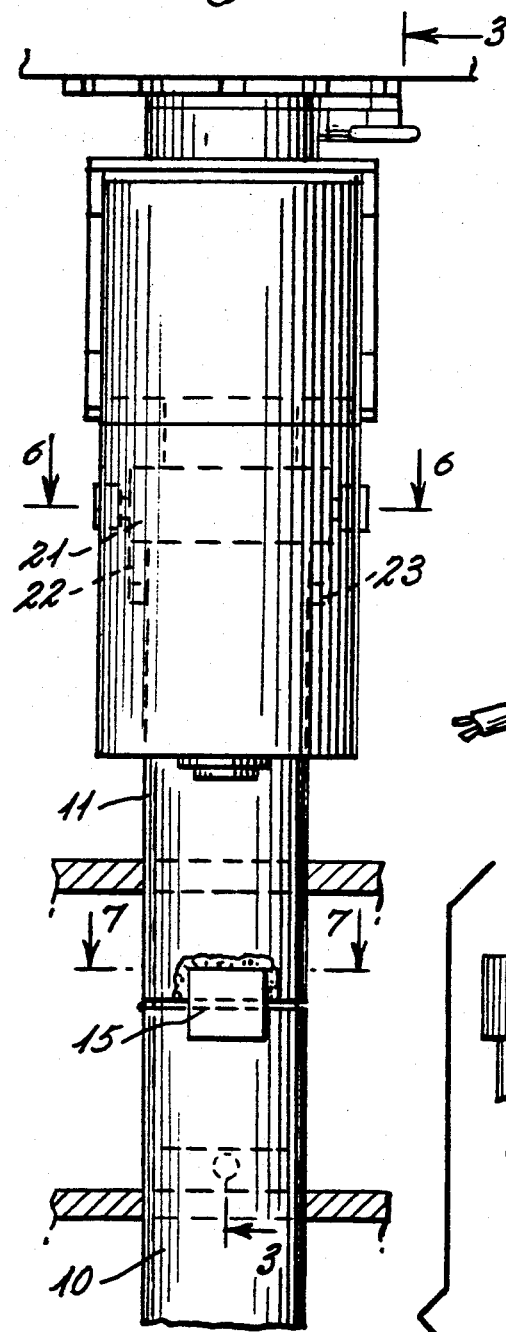
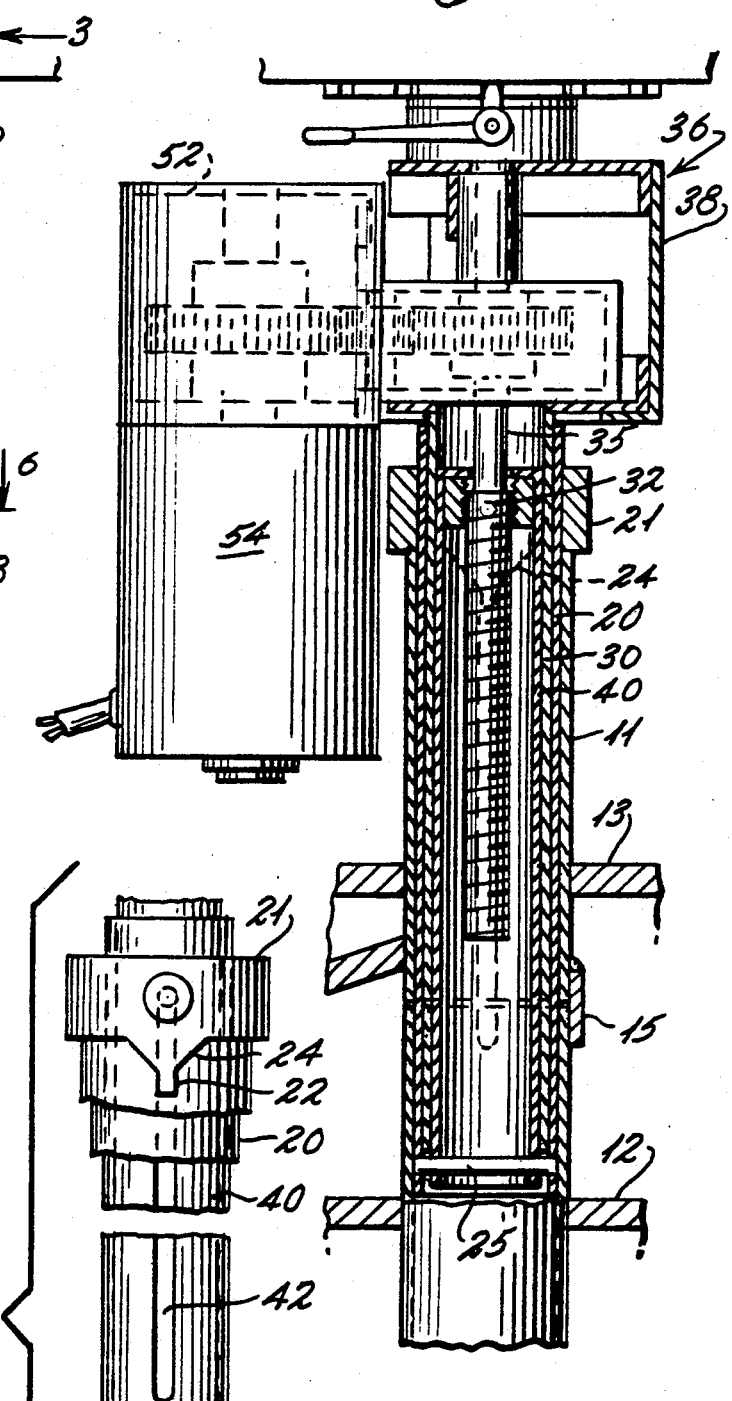
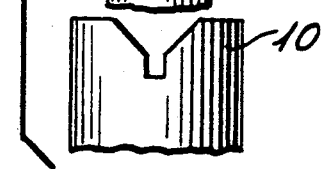

ELECTRIC SEAT LIFT

BACKGROUND OF THE INVENTION

1. Field of the Invention

This invention relates to supports and more particularly to seats that are used on devices such as electric scooters, especially those used for the physically impaired, although not limited thereto.

The invention is more particularly related to a seat assembly which may be easily mounted and removed from a device such as an electric scooter and which may be raised and lowered by an electric motor in the assembly.

2. Description of the Related Art

Seats that may be raised and lowered by power means are well known in the art for various purposes. So too are devices for supporting various parts of the human anatomy. Many of these have included a motor drive screw for moving a nut to which is attached a mechanism whose positioning is desired.

Thus, the Holm U.S. Pat. No. 3,191,196 discloses a hospital bed rest in which the motor 72 is supported on the frame 10 for driving the associated linkage.

The Karchak et al. U.S. Pat. No. 3,905,436 discloses an adjustable wheelchair in which the motor 73 and transmission 74 are supported on the carriage 11 for driving the seat linkage.

The Norris et al. U.S. Pat. No. 4,173,372 discloses a dental chair in which the motors 70 and 150 are secured to the frame of the chair for driving the elevating linkage.

The Love et al. U.S. Pat. No. 4,587,678 discloses a motor which is mounted on the base of a seat for driving the linkage to raise the toilet seat.

The Chizek U.S. Pat. No. 4,678,231 discloses a mechanism in which an arm 50 mounts a transmission housing and motor on a bracket arm 38 which is carried by the base 32 for adjusting the linkage of the chair.

The United States patent to Parker et al. discloses a reclining chair in which a motor 34 is mounted on the lower part of the chair for driving a rod that oscillates the upper back portion.

In the foregoing patents, the motor is mounted on a base which opposes the reaction of a non-rotating threaded part (drive nut) when a drive screw is rotated.

The Menges U.S. Pat. Nos. 1,600,597 and 1,606,654 disclose vehicle jacks in which the electric motor and a support structure is mounted on the elevatable part of the jack mechanism.

SUMMARY OF THE INVENTION

It is an object of the invention to provide an electric seat lift mechanism which may be easily connected with and removed from a conventional seat post receptacle without the need for tools or multiplicity of steps.

A further object of the invention is the provision of a electric seat post mechanism which is self-contained, not requiring any other structure for its use, except that it be mounted in a conventional seat post receptacle.

The embodiment of the invention includes an electric motor connected to drive a transmission in a support housing which supports the seat of a scooter or other vehicle or device. The transmission support housing has a depending tube that extends downwardly and is of a diameter and length to be received within the upstanding receptacle post of a scooter or the like. The depending tube includes an outer tube that is connected to an inner depending tube which carries a drive nut engaging a drive screw that is connected to the transmission. Spaced between the outer depending tube and the tube for the drive nut is a third tube which is connected to the transmission support housing. Rotation of the drive screw within the fixed drive nut causes the transmission and its housing and the seat to be raised or lowered, depending on the direction of rotation of the electric motor.

BRIEF DESCRIPTION OF THE DRAWINGS

FIG. 1 is a side elevation of an electric scooter with an electric seat lift in accordance with the present invention;

FIG. 2 is an end view, to an enlarged scale of the seat lift installed in a tube post on the scooter;

FIG. 3 is a section on the line 3—3 of FIG. 2;

FIG. 4 is a fragmentary elevation, partly in section, to an enlarged scale, illustrating the assembly of the seat post and stop to the seat post tube, and the slot in the support tube;

FIG. 5 is a section to an enlarged scale on the line 5—5 of FIG. 1; and

FIGS. 6 and 7 are sections on the lines 6—6 and 7—7 of FIG. 2.

DESCRIPTION OF THE PREFERRED EMBODIMENT

With further reference to the drawings, FIG. 1 represents a scooter of the kind with which the present invention may be used, although not forming any part thereof, and including a seat lift in accordance with the invention. The scooter has a central platform P, a front wheel W, a pair of rear wheels W, a steering lever L, a steering post SP, a rear housing for the motor RH, a front housing FH and a seat S.

In one form of scooter, the front and rear frame sections are separable along the line A to provide a front section and a rear section; and the supporting seat post tube has coaxial sections, upper and lower, which are aligned when the front and rear frame sections are assembled. Thus, in the illustrated embodiment, the rear frame seat post tube 10 is mounted on the rear frame carrying the housing RH. The front frame seat post tube 11 is mounted within the housing FH which in turn carries the seat assembly S.

Deck support members 12 for the tube 10, and 13 and 14, for the tube 11, tend to align the tubes when the two are brought into abutting relationship for assembly of the scooter. An alignment tab 15 is connected to the tube 11 to ensure the proper alignment of the tubes. The aligned tubes 10 and 11 therefore provide a continuous tube post connected to the assembled housing sections of the scooter which is adapted for the reception of a conventional seat post or a seat post of an assembly in accordance with the present invention.

Other tube posts may be used, the foregoing illustrating the environment in which the invention may be used.

The tube post receives a seat post 20 of the present invention which has a ring 21 connected thereto at its upper end so that when the post 20 is lowered within the tubes 10 and 11 the ring 21 abuts the upper end of the tube 11 and provides a stop. The ring 21 has a pair of tangs 22 and 23 depending from its sides which engage notches 24 in tube 11. This arrangement provides not only a stop but also fixes the orientation of the tube 20 with respect to the tubes 10 and 11.

The notches are provided in the tube post 11 in order that when a conventional seat post, not shown, is inserted, a pin, not shown, may extend through such conventional post and engage the notches in order to limit the extent to which the conventional post may be lowered into the tube post 11. The present invention, for convenience, employs the tube post 11 and its notches, as described. In the event that a tube post is used which does not have such notches, appropriate structure or provision within the skill of the art, may be provided to prevent rotation between the seat post and the tube post, in the event that the interfacial relationship between these parts is, by itself, not adequate.

At its lower end, the sides of the tube 20 receive a pin 25 for purposes which will be described.

It will be understood that during assembly the tube 20 is lowered within the tubes 10 and 11, thus assisting in maintaining the tubes 10 and 11 in alignment. Tube 20 remains in place until disassembly is desired, which involves merely lifting the assembly, including the tube 20, out of engagement with the tubes 10 and 11, no tools being required.

Positioned within the tube 20 and in radially spaced relation from its walls is a transmission nut support tube 30 which is substantially coextensive with the tube 20 and through the lower end of which the pin 25 extends thereby fixing the tube 30 within the tube 20.

The upper end of the tube 30 carries a drive nut 32 which engages a threaded shaft 34 connected to a drive shaft 35 extending upwardly into a drive assembly housing 36.

The housing 36 has a front mounting bracket 38 connected to a bottom mounting bracket 39 from which a transmission support tube 40 depends.

The support tube 40 is slidably received within the radial space between the tubes 20 and 30. The tube 40 is substantially coextensive in length with the tubes 20 and 30 although extending slightly above them at the top, and stopping short of the pin 25 at the bottom. Thus, the tube 40 may be raised and lowered within the confines of the tubes 20 and 30.

In order to resist any tendency of the tube 40 to rotate with the housing during the rotation of the shaft 35 to change the elevation of the seat, the tube 40 has a longitudinal slot 42 along its sides and at its upper portion received within the tube 10. The slots are engaged by pins 44 which extend through the ring 21 and the tube 20 into engagement with the nut support tube 30. The pins 44, riding in the slots 42, permit vertical movement of the tube 40 but prevent rotation thereof with respect to the support tubes 10 and 11, the pin, itself, being fixed due to its engagement with the ring 21 and tube 20.

The shaft 35 is connected to a transmission gear assembly 50 within the housing 36 and a transmission support or housing 52 and is driven by a reversible motor 54 which is connected by leads 55 to the battery of the scooter. The motor is controlled by buttons 56 on the seat or at any preferred location, the buttons operating the motor in either direction.

It is contemplated that in the ordinary driving position that the tubes will be in the relative position indicated in FIG. 3. However, when the user wants to reach something on a shelf or a counter which is at a higher elevation than the seat conveniently provides then the adjustable seat mechanism may be used. Thus, the user would drive the scooter into position near the shelf. The user would then depress the appropriate button 56 in order to drive the motor to raise the seat to the desired position. As the terminal ends of the tubes are reached, limit switches (not shown) terminate the actuation by the motor 54. These limit switches operate in both the upward and lower position of the movement of the drive screw 34.

I claim:

1. An electric seat lift for use with a generally upright tube post having an upper end, comprising, first tube means received within and interengaged with said tube post, second tube means received within said first tube means, third tube means received within said second tube means, means interengaging said first tube means and said third tube means, wherein the operative position of said tube post, said first tube means and said third tube means is fixed, a drive nut fixed to said third tube means, a drive screw threadingly engaged with said drive nut, transmission means connected to said drive screw, reversible motor means connected to said transmission means, said transmission means having support means, said support means connected to said second tube means, and seat support means mounted on said support means, whereby rotation of said screw by said motor means operates to raise or lower said second tube means and said seat support means according to the direction of rotation.

2. The invention of claim 1 in which said first tube means has abutment means extending from said first tube means and non-rotatably engaging the upper end of said tube post.

3. The invention of claim 1 in which the means interengaging said first tube means and said third tube means is a diametrically extending pin.

4. The invention of claim 1 in which said drive screw extends longitudinally within said third tube means.

5. The invention of claim 1, and means interengaging said first tube means and said second tube means and preventing relative rotation therebetween but permitting relative longitudinal movement.

6. The invention of claim 5, in which said means interengaging said first and second tube means is a pin means extending from said first tube means and engaging a longitudinal slot in said second tube means.

7. An electric seat lift for use with a generally upright tube post mounted on a base, comprising support means removably engaged with said post, screw engaging means connected to said removably mounted support means, drive screw means threadingly engaged with said screw engaging means, driving means connected to said drive screw means, housing means non-rotatably carried by said driving means, and motor means connected to drive said driving means, said seat being carried by said housing means.

8. The invention of claim 7 in which said motor means is a reversible electric motor.

9. The invention of claim 7 in which said support means is a tube having a non-rotatable slip-joint engagement with said post.

* * * * *